Patented June 28, 1927.

1,633,895

UNITED STATES PATENT OFFICE.

ALBERT EMIL KIENZLE, OF CAIRO, EGYPT.

METHOD OF WORKING SUGAR CANE.

No Drawing. Application filed March 25, 1925, Serial No. 18,300, and in Germany January 19, 1923.

This invention relates to a method of working sugar-cane and to certain useful products obtained thereby. The new method consists essentially in cutting the sugar-cane into chips or discs of preferably 2–5 millimeters thickness and in drying and grinding the chips or discs. The flour so obtained owing to its considerable sugar content can be used directly as an article of food for cattle and for men. If used for the purpose of human nourishment the sugar-cane flour may form a component of a variety of products such as ginger-breads, biscuits, cakes and sweetmeats generally. The flour may also be used as an addition to cocoa, chocolate, artificial honey, fruits, jams, juices, syrups, and a variety of beverages and liquors such as lemonade, beer, wine, rum and liqueur. A further field of use of the flour is in distillery.

The quality of the product of the sugar-cane treatment according to the invention largely depends upon the drying temperature employed.

If the chips are dried at a low temperature a pure white or slightly yellow product is obtained and the flour made therefrom has a honeylike taste and smell. If dried at a higher temperature the chips become brown and the flour made therefrom has the flavour and smell of malt. If dried at a still higher temperature the chips become dark brown and the flour thereof may be used in the manufacture of caramel-beer and other products having a caramelized sugar content. By further raising the drying temperature a still more extensive conversion of the sugar is effected and the resulting product is not sweet but resembles roasted coffee with respect to its smell and taste and coloring quality. For these reasons roasted sugar cane flour may be used as a substitute for coffee or otherwise as a coloring and flavoring ingredient in food preparation.

The heat treatment of the sugar cane may be completed before grinding or the heat treatment may be effected in stages partly before grinding and partly afterwards.

The different parts of sugar-cane are different with regard to their sugar contents. The outer layer of the sugar-cane and also its knots are very poor in sugar whereas the pith is rich. Consequently it is possible to divide up the sugar-cane into a portion rich in sugar and a portion poor in sugar. This can be done either by separating the skin and knots from the remainder of the cane and subjecting the several portions to separate treatment or by suitably conducting the grinding process. The skin or bark of the cane and the knots being much harder than the pith are more resistant to pulverization and the coarser particles formed therefrom during grinding can be separated to a certain extent from the finer particles of the pith by sifting.

The sugar content of undried sugar-cane varies between about 12 and 22%. Dry sugar-cane containing 5–10% of water contains 40–70% of sugar. Sugar-cane flour obtained by grinding chips or discs of dry cane may be divided by sifting into four grades as follows: The coarsest about 15% being very poor and even nearly free from sugar and mainly consisting of the grinding product of the skin and knots may be used as fuel or in cattle food. For the three further grades divided up into equal portions values of the sugar contents have been found as follows:

50–80% for the finest grade.
40–70% for the grade of middle fineness.
25–60% for the coarsest grade.

The finest and sweetest grade flour is particularly well adapted for use in the manufacture of confectionery may it be as the sole sweeting agent or in combination with pure sugar. The middle grade product is particularly adapted for preparing sweet liquors. The coarsest of the said three sugar containing grades of flour may be used in distilleries for the production of alcohol.

The following table shows the results of the analysis of the finest and of the coarsest of three grades of flour of Otahiti sugar-cane with about 15% contents in sugar; the numerical values show the quantities of the several constituents contained in hundred parts of dry material.

| | Finest grade. | Coarsest grade. |
|---|---|---|
| Fibre | 8.71 | 15.68 |
| Sugar | 70.94 | 58.97 |
| Other extractive matter free of nitrogen | 16.88 | 21.35 |
| Crude protein | 1.63 | 1.62 |
| Ashes | 1.84 | 2.38 |

The new method is applicable to every kind of sugar-cane including the inferior so called "sorghum" kinds and the "Zwenga" sugar-cane.

In cutting the cane into chips or discs it is advisable to make the cuts inclined to the direction of the axis of the cane so as to produce discs of extended area in order to facilitate the drying and the grinding operations.

The sugar-cane flour produced as above described is liable to become decomposed in moist climates. In order to avoid this difficulty and to make a product adapted for exportation the flour may be subjected to briquetting. In order to further assist the preserving effect of the briquetting operation the briquettes may be packed into airtight containers or they may be impregnated with preserving liquids or covered with a protecting layer such as a pure sugar coating. The form and size of the briquettes being immaterial it is also possible to tightly pack the flour in portable receptacles such as sheet metal barrels so that the contents of a barrel as a whole forms one single briquette.

What I claim is:—

Process of treating sugar-cane which comprises reducing the cane to flour and dividing the flour into a plurality of grades with respect to sugar content by sifting.

In testimony whereof, I affix my signature.

ALBERT EMIL KIENZLE.